United States Patent [19]

Hickey

[11] Patent Number: 4,494,451
[45] Date of Patent: Jan. 22, 1985

[54] BREWING APPARATUS
[75] Inventor: John F. Hickey, London, England
[73] Assignee: Hickey & Company Limited, London, England
[21] Appl. No.: 442,154
[22] Filed: Nov. 16, 1982
[30] Foreign Application Priority Data
Nov. 17, 1981 [GB] United Kingdom ............... 8134643
[51] Int. Cl.³ ............................................. C12C 7/14
[52] U.S. Cl. ........................................ 99/276; 426/30
[58] Field of Search ................. 99/276, 277, 277.1, 99/277.2, 278; 435/287, 316; 426/30

[56] References Cited
U.S. PATENT DOCUMENTS
2,359,876 10/1944 Schwaiger .............................. 99/278
3,057,726 10/1962 Shore .................................... 99/276
3,207,606 9/1965 Williams ................................ 99/276

Primary Examiner—Robert W. Jenkins
Attorney, Agent, or Firm—Fleit, Jacobson, Cohn & Price

[57] ABSTRACT

Brewing apparatus which comprises a first vessel including heating means, a second vessel including strainer means, a third vessel, and a valve means and pump arrangement by means of which the three vessels can be coupled as necessary for fluid transfer purposes so that the first vessel can be used firstly as a hot liquor tank to produce hot liquor which is transferred to the third vessel which serves firstly as a hot liquor container, from which in use the hot liquor is transferred to the second vessel wherein it is mashed with malt to produce a wort and which serves firstly as a mash tun, from which the wort is transferred to the first vessel therein to be heated with hops whereby the first vessel serves secondly as a brewing kettle from which the resultant brew is transferred to the third vessel which serves secondly as a fermenting vessel.

9 Claims, 2 Drawing Figures

BREWING APPARATUS

This invention relates to brewing apparatus and more especially it relates to apparatus for brewing beer.

Apparatus for brewing beer on a commercial scale is quite well known and usually comprises at least six vessels which are used sequentially during the brewing process to produce from a malt mash, wort which is brewed with hops and then fermented to produce beer. The apparatus usually comprises a hot liquor tank comprising a heater in which water is initially heated, an insulated hot liquor container in which the heated water is stored, a mash tun to which the hot liquor is transferred for mashing with malt, a brewing copper in which the wort produced by the mashing process in the mash tun is heated with hops to produce a brew, a hop back to which the brew is transferred, and a fermenting vessel to which the brew is transferred from the hop back via a filter or strainer effective to remove the spent hops and in which the brew is fermented with yeast to produce beer.

It will of course be appreciated that other additional vessels and apparatus such as an underback and a heat exchanger may also be used. The apparatus as just before described is very costly since high quality non-corrosive materials must be used and moreover the apparatus occupies a considerable floor area. The plant cost and floor area occupied are often not significant in large commercial brewing operations but there is now a requirement for so called real ale which is produced on the premises of a public house or similar establishment licensed to produce beer as well as to sell it.

Connoisseurs of beer often prefer so called real ale which has been brewed on the premises of the selling establishment since the brewer/licensee has full control of the brewing process from hops to glass and can therefore produce a brew which reflects his care and attention to the process.

Commercial brewing plants are generally too expensive and occupy too much floor area to suit a brewer in a relatively small way of business. It is therefore an object of the present invention to provide brewing apparatus which will appeal more especially to this section of the trade.

According to the present invention there is provided brewing apparatus which comprises a first vessel including heating means, a second vessel including strainer means, a third vessel, and a valve means and pump arrangement by means of which the three vessels can be coupled as necessary for fluid transfer purposes so that the first vessel can be used firstly as a hot liquor tank to produce hot liquor which is transferred to the third vessel which serves firstly as a hot liquor container, from which in use the hot liquor is transferred to the second vessel wherein it is mashed with malt to produce a wort and which serves firstly as a mash tun, from which the wort is transferred to the first vessel therein to be heated with hops whereby the first vessel serves secondly as a brewing kettle from which the resultant brew is transferred to the third vessel which serves secondly as a fermenting vessel.

By providing apparatus in which three principal vessels only are required, the floor area required is minimised and the capital cost of the apparatus is greatly reduced. The apparatus is therefore appealing to a brewer in a small way of business.

The apparatus may additionally comprise an underback which is a vessel which comprises a float valve to serve for liquid level control purposes and which in use is coupled to receive liquor from the second vessel.

The apparatus may also comprise a plate heat exchanger having two passage means separated by a wall through which heat can pass but which is impervious to liquid, whereby hot liquor can pass through one passage means so as to give up its heat to cooler liquor which is passed through the other passage means, the heat exchanger being in use arranged to receive in one passage means cool water for the purposes of cooling hot wort which is passed from the first vessel to the third vessel.

The valve means will usually be a swing bend panel means. The swing bend panel means may comprise a plurality of pipe coupling ports which communicate with inlet and outlet pipes of the vessels and which are arranged on at least one panel, and a coupling pipe which is provided at each end with coupling means which are complementary with the coupling ports whereby the vessels may be linked for fluid transfer purposes via the swing bend means.

The valve and pump arrangement may comprise two electrically driven centrifugal pumps operatively associated with the vessels and with the swing bend means.

The heating means in the first vessel may be an electrical emersion heater, a steam coil or gas jets.

The first vessel may also be provided with removeable filter means, such for example as a strainer or grill, for filtering spent hops.

The strainer means in the second vessel may comprise a removeable strainer means such for example as a removeable grill, for filtering spent malt.

The third vessel may comprise an outer jacket through which coolant can be passed.

The apparatus may be supported on a platform. The platform may be levelled by means of adjustable feet.

The apparatus may additionally include a cool liquor storage tank provided with a float valve operative to control the level of liquid therein.

The first vessel will usually include strainer means.

An embodiment of the invention will now be described solely by way of example and with reference to the accompanying drawings in which.

Figure 1:
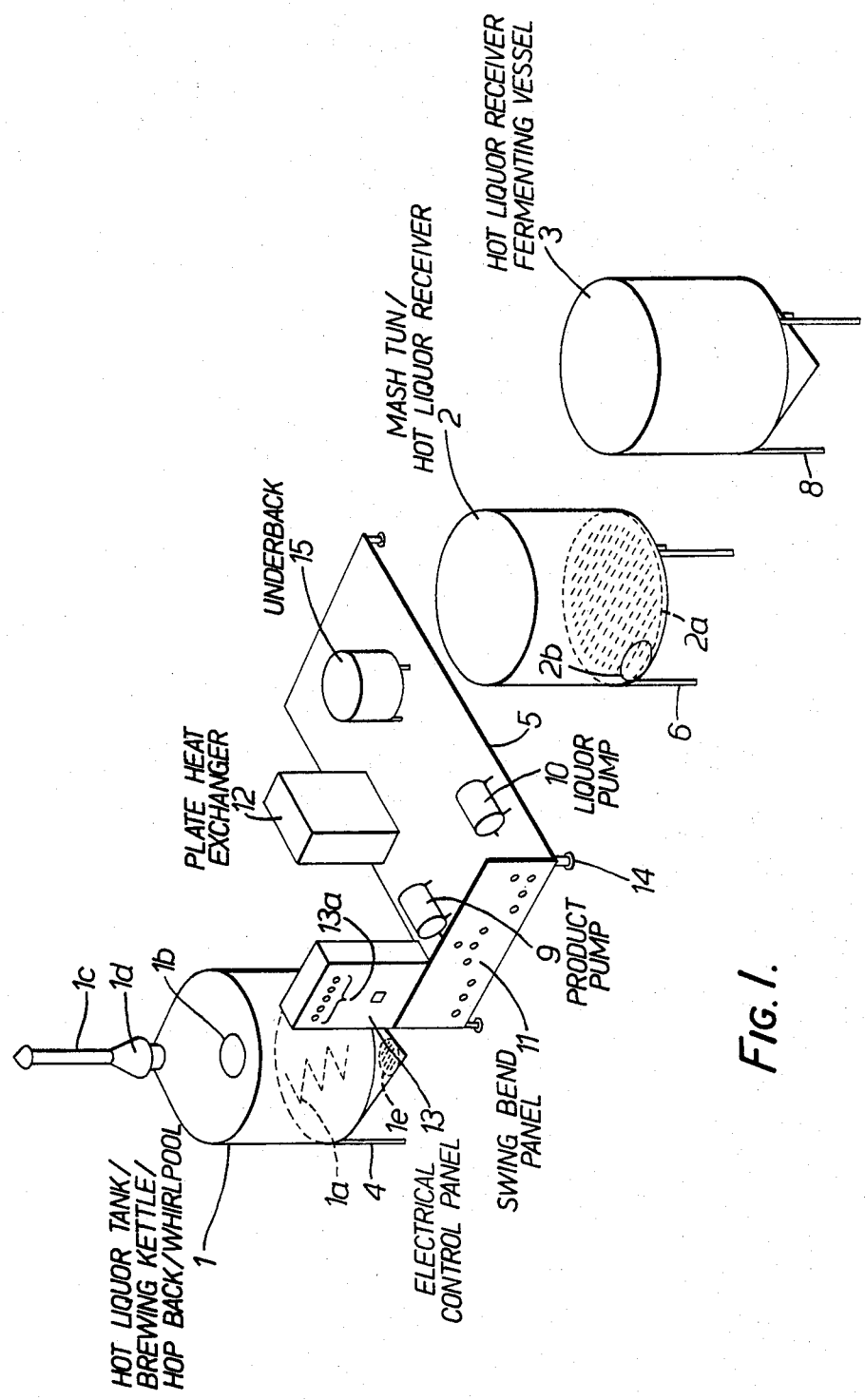
FIG. 1 is a generally schematic front elevation of brewing apparatus.

Referring now to FIG. 1, brewing apparatus comprises three main vessels 1, 2 and 3. The vessels are cylindrical and fabricated of stainless steel in 304 quality. Seams of the vessels are welded by an argon arc process and all welded seams are ground and polished so as to blend with the parent metals.

Each of the vessels 1, 2, and 3 serves for at least two purposes. The vessel 1 serves as a hot liquor tank, a brewing kettle, a hop back and a whirlpool. A heating means 1a, which may be an electric, steam or gas heating means, is provided in the vessel 1. Temperature control of the heating means is effected by a temperature sensing probe (not shown) which is mounted in the wall of the vessel 1.

The upper part of the vessel 1 is domed and it is provided with a quick release manway 1b, a chimney 1c, and a condenser bell 1d which has drain means (not shown).

The lower part of the vessel 1 is conical as shown and it is provided with a quick release manway, which is not shown but which is like the manway 1b. The quick release manway is provided with a filter plate 1e for hop filtering and hop removal. The filter plate 1e is shown somewhat schematically for ease of illustration.

A thermometer (not shown) is provided in a pocket in the wall of the vessel 1.

The vessel 1 sits on three stainless steel adjustable legs 4. The vessel 1 is insulated to reduce heat loss. The insulation may be effected by using a stainless steel or wood outer skin, and sandwiching mineral wool between the wall of the vessel 1 and the outer skin.

The vessel 2 serves both as a mash tun and as a hot liquor receiver. The vessel 2 is provided with a false bottom plate 2a which is removeable and manufactured with machined slots, whereby the false bottom plate 2a serves as a strainer means through which the wort can pass in the brewing process, but by means of which malt is held back. A quick release manway 2b is provided in the wall of the vessel 2 at or about the level of the false bottom plate 2a so as to facilitate removal of spent malt grains from the vessel 2.

The vessel 2 is provided with two lids (not shown) which are supplied with handles. The lids are used to prevent as much steam as possible from leaving the vessel 2 and so filling the room in which the brewing apparatus is installed with steam. The vessel stands on three stainless steel adjustable legs 6. The vessel 2 is insulated to reduce heat losses. The insulation is achieved by providing the vessel 2 with a stainless steel or a wood outer skin, and sandwiching mineral wool between the wall of the vessel 2 and the outer skin.

The vessel 3 is used as a hot liquor receiver and as a fermenting vessel. The vessel 3 comprises an outer stainless steel attemperation jacket 7, shown in FIG. 2, through which cold water can be passed to control the temperature of fermentation. The vessel 3 also sits on three stainless steel adjustable legs 8. A thermometer (not shown) is provided in a pocket in the wall of the vessel 3.

The vessel 3 is insulated to reduce heat losses. This insulation is achieved by providing the vessel 3 with a stainless steel or wooden outer skin, and sandwiching mineral wool between the wall of the vessel 3 and the outer skin.

In order to facilitate transfer of liquor from one vessel to another, a valve means and pump arrangement is provided. The valve means and pump arrangement comprises two pumps 9 and 10 and a swing bend panel 11. The pump 9 is a product pump and the pump 10 is a liquor pump. The two pumps 9 and 10 communicate via pipe work and the swing bend panel 11 with the vessels. The swing bend panel 11 comprises a panel at which pipes communicating with the vessels are terminated and in which the terminations of the pipes are provided with couplings so that the pipe terminations may be linked as necessary by means of a U-bend tube (not shown) fitted with complementary coupling pieces.

In order to remove excess heat during certain stages of the brewing process, a plate heat exchanger 12 is provided and control of the pumps 9 and 10 is effected by means of control switches mounted on an electrical control panel 13 which is also used to support indicator lamps 13a. The platform 5 on which some of the apparatus is mounted includes level adjuster means 14 which facilitate adjustment to accommodate variations in floor level.

Connected to the vessel 2, is an underback 15 which comprises a small cylindrical vessel arranged to receive liquor from the vessel 2, the underback 15 being gravity fed from the vessel 2 and including a stainless steel float and a valve which regulates the flow of liquid from the vessel 2 to the underback 15. The underback 15 serves to prevent the mash bed from being pulled down through the false bottom plate 2a by the pump 9 and in effect acts as a buffer.

Figure 2:
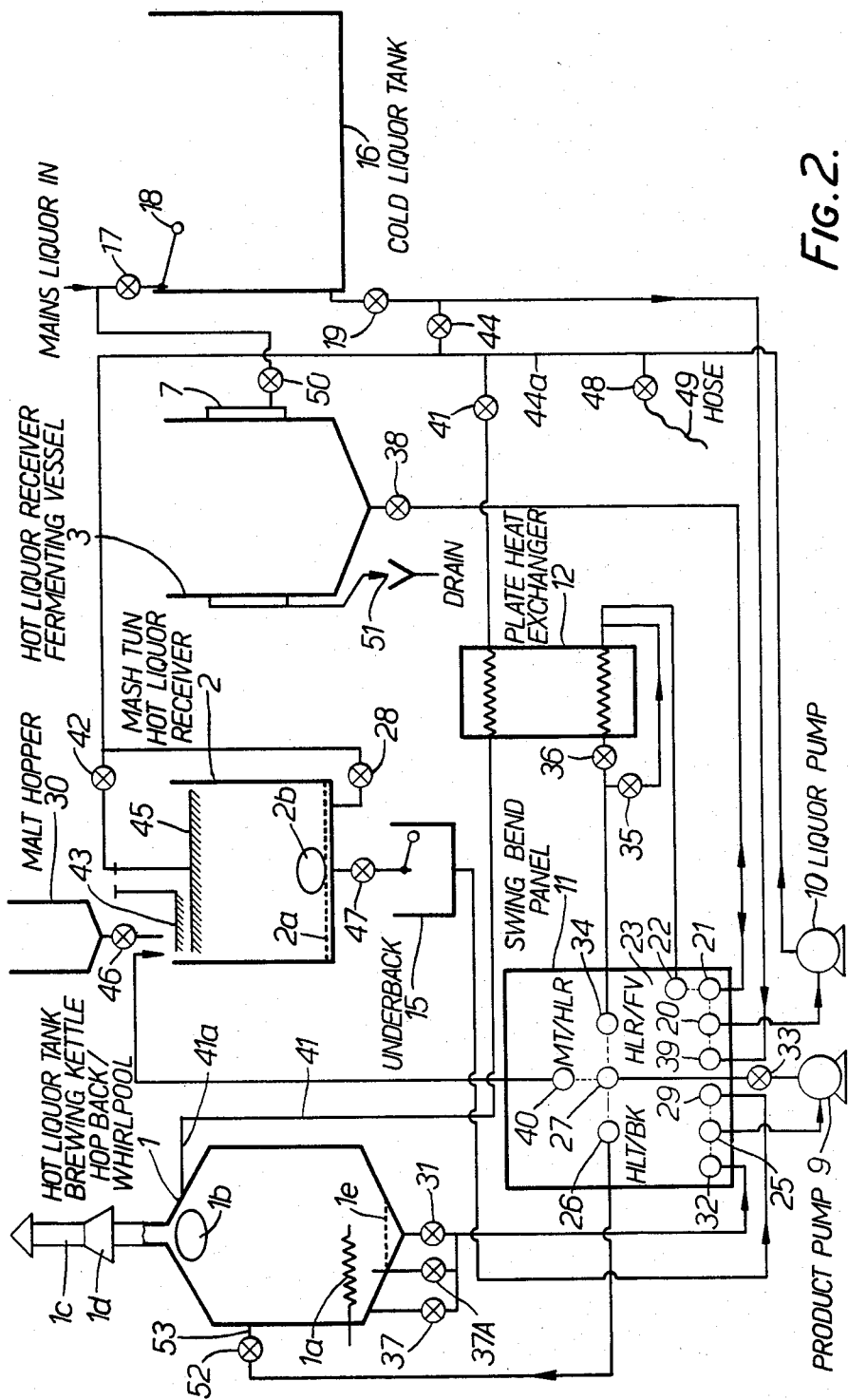
FIG. 2 is a somewhat schematic flow diagram illustrating the valves, pipework and fluid coupling pipes which extend between the vessels shown in FIG. 1.

The manner in which the apparatus shown in FIG. 1 is operated in the brewing process will now be described with reference to FIG. 2, wherein corresponding parts bear where appropriate the same numerical designation as in FIG. 1.

The vessel 1 is filled initially with water from a cold liquor tank 16 which is coupled to the mains via a inlet valve or stop cock 17. The level of liquor in the cold liquor tank 16 is controlled by means of a valve (not shown) which is operated by a ball float 18. In order to transfer cold liquor from the cold liquor tank 16 to the vessel 1, a valve 19 is opened, and ports 39 and 20 of a swing bend panel 23 as shown are linked with a U-bend coupling.

The liquor pump 10 shown also in FIG. 1 is started and cold liquor (i.e. water) is transferred from the cold liquor tank 16 to the ports 39 and 20, and then through the pump 10 to the vessel 1 via a valve 41 and the plate heat exchanger 12. It will be appreciated that a cold liquor tank is not essential and cold water may be provided direct from the mains. Liquor in the vessel 1 is heated to approximately 70° C. by the heating means 1a. The heating means 1a may be an electrical heater, a steam coil or gas jets.

Hot liquor from the vessel 1 is transferred via a valve 31, ports 32 and 20 of the swing bend panel 23, the liquor pump 10, and a valve 42 to a mashing-in arm 43. The mashing-in arm 43 is a fixed arm having jets through which the hot liquor sprays.

A valve 46, which communicates with a malt hopper 30, is opened, and the hot liquor from the mashing-in arm 43 is mixed with the malt from the malt hopper 30 in the vessel 2. the mixing ratio is 2.5 to 1 of hot liquor to malt and this produces a porridge like consistency of mash in the vessel 2. After mashing in, the mash is allowed to stand for about one hour to achieve starch conversion. During this period of starch conversation, the remaining liquor in the vessel 1 is heated up to approximately 80° C. and is then transferred via valves 31 and 33 and ports 32, 25, 27, 34, 22, 21 of the swing bend panel 23, the product pump 9, and valves 35 and 38 to the vessel 3. Valve 36 is shut during this transfer operation. A valve 44 is used to inject cold liquor into the hot liquor line 44a to achieve the correct striking heat temperature.

To begin the sparging process, a valve 38 is opened to release hot liquor from the vessel 3. This hot liquor is fed via ports 21 and 20 of the swing bend panel 23 to the liquor pump 10. The hot liquor from the liquor pump 10 is transferred via the valve 42 into a rotating sparge arm 45 for sparging purposes. The sparge arm 45 is constructed to rotate due to the force of the liquor expelled from spray jets positioned along its length. The valve 42 is adjusted to control the speed of rotation of the sparge arm 45. At the beginning of the sparging process, a valve 47 is also opened which allows wort to flow from the vessel 2 to the underback 15. Wort is transferred from the underback 15 via ports 29, 25, 27 and 26 of the swing bend panel 23, the product pump 9 and the valves 33 and 52 to the vessel 1. The vessel 1 now serves as a brewing kettle or brewing copper.

An underlet valve 28 is used to allow hot liquor from the vessel 3 to enter the vessel 2 below the false bottom plate 2a, via the valve 38, ports 21 and 20 and the liquor pump 10. The hot liquor entering the vessel 2 via the underlet valve 28 can be used to either lift the mash bed in the vessel 2 or to raise the mash temperature in the vessel 2.

Wort in the vessel 1 is now boiled for a period of approximately 1½ hours giving an evaporation of approximately 10%. Hops are added to the wort so that the vessel 1 is now used as a hop back. At the end of the boil, the wort is transferred through the filter plate in the bottom of the vessel 1 and via valves 31, 33, 36 and 38, ports 32, 25, 27, 34, 22 and 21 of the swing bend panel 23, the plate heat exchanger 12, and the product pump 9 to the vessel 3, which vessel 3 is now used as a fermenting vessel. During this transfer of the wort from the vessel 1 to the vessel 3 via the plate heat exchanger 12, the valve 35 will obviously be closed so that the heat exchanger 12 is not bypassed.

In order to effect cooling of the wort, the valve 19 is opened again and the liquor pump 10 linked up via ports 39 and 20 with valve 41. The valve 41 is opened, allowing the cold liquor to flow through the plate heat exchanger 12 and into the vessel 2, which then serves as a hot liquor receiving vessel. The flow of cold liquor into the vessel 2 is achieved by disconnecting the top part 41a of the pipe 41 and rotating it from the vessel 1 to the vessel 2.

The valve 36 is used to regulate the flow of wort through the plate heat exchanger to the vessel 1.

If during fermentation, the temperature rises unduly, a valve 50 is opened to admit cooling water to the cooling jacket 7. The cooling water from the jacket 7 is passed to a drain 51.

A valve 48 is opened when cleaning the equipment with a hose 49.

It will be appreciated that the valves 33 and 41 associated with the pumps 9 and 10 respectively are used only as pump flow controllers when flow conditions from the pumps 9 and 10 are required to be changed.

Valves 37 and 37a are used when the vessel (1) is being used as a whirlpool. The wort tangentially enters the vessel 1 through the valve 52 and its associated pipe 53. The tangential entry of the wort causes the contents of the vessel 1 to spin. The spinning separates the hot trub from the wort. The wort is drawn off from the vessel 1 through the valves 37 and 37a, and then the wort is passed to the plate heat exchanger 12 and the fermenting vessel 3 as described above.

By utilizing the brewing apparatus as hereinbefore described, it will be appreciated that a significant economy is effected without degrading in any way the efficiency of the brewing process and accordingly brewing apparatus is afforded which process and accordingly brewing apparatus is afforded which is both compact and economical and therefore especially attractive to the small brewer.

I claim:

1. Brewing apparatus which comprises a first vessel including heating means, a second vessel including strainer means, a third vessel, coupling pipes coupling the first, second and third vessels together, and a valve means and pump arrangement by means of which the three vessels can be coupled via the coupling pipes as necessary for fluid transfer purposes so that the first vessel can be used firstly as a hot liquor tank to produce hot liquor which is transferred to the third vessel which serves firstly as a hot liquor container, from which in use the hot liquor is transferred to the second vessel wherein it is mashed with malt to produce a wort and which serves firstly as a mash tun, from which the wort is transferred to the first vessel therein to be heated with hops whereby the first vessel serves secondly as a brewing kettle from which the resultant brew is transferred to the third vessel which serves secondly as a fermenting vessel.

2. Brewing apparatus according to claim 1 and including an underback which is a vessel which comprises a float valve to serve for liquid level control purposes and which in use is coupled to receive liquor from the second vessel.

3. Brewing apparatus according to claim 1 and including a plate heat exchanger having two passage means separated by a wall through which heat can pass but which is impervious to liquid, whereby hot liquor can pass through one passage means so as to give up its heat to cooler liquor which is passed through the other passage means, the heat exchanger being in use arranged to receive in one passage means cool water for the purposes of cooling hot wort which is passed from the first vessel to the third vessel.

4. Brewing apparatus according to claim 1, claim 2 or claim 3 in which the valve means comprises a plurality of pipe coupling ports which communicate with inlet and outlet pipes of the vessels and which are arranged on at least one panel, and a coupling pipe which is provided at each end with coupling means which are complementary with the coupling ports whereby the vessels may be linked for fluid transfer purposes.

5. Brewing apparatus according to claim 1, claim 2 or claim 3 in which the valve means and pump arrangement comprises two electrically driven centrifugal pumps operatively associated with the vessels.

6. Brewing apparatus according to claim 1, in which the strainer means in the second vessel is a removeable filter means for filtering spent malt.

7. Brewing apparatus according to claim 1, in which the third vessel includes an outer jacket through which coolant can be passed.

8. Brewing apparatus according to claim 1, and including a cool liquor storage tank provided with a float valve operative to control the level of liquid therein.

9. Brewing apparatus according to claim 1 in which the first vessel includes strainer means.

* * * * *